Aug. 7, 1923.
V. W. PAGÉ
1,464,392
INTERNAL BRAKE
Filed March 24, 1921
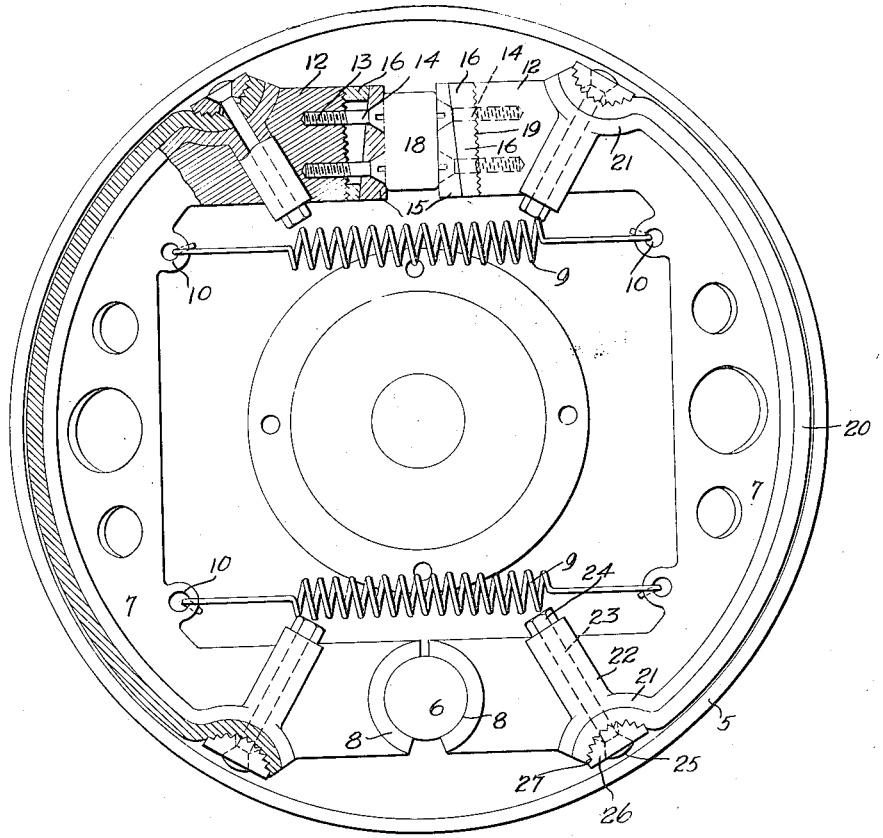
WITNESSES
P. H. Pattison
Grace Valentine
Inventor
VICTOR W. PAGÉ
By Attorney Patented Aug. 7, 1923.

1,464,392

UNITED STATES PATENT OFFICE.

VICTOR W. PAGÉ, OF KEW GARDENS, NEW YORK, N. Y.

INTERNAL BRAKE.

Application filed March 24, 1921. Serial No. 455,039.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Internal Brake, of which the following is a full, clear, and exact description.

The present invention relates to new and useful improvements in vertical brakes and it pertains more particularly to brakes of the internal type. Brakes of this type are generally operated by expanding brake shoes into contact with a braking drum. These brake shoes are generally expanded by means of a cam which operates between the ends of the brake shoes to spread the same. Great difficulty has been experienced in the wearing of the cam and the surfaces with which it engages to spread the shoes, and it is the primary object of the present invention to provide adjustable surfaces for the cam to engage in order that the throw of the shoes may be restored to normal when the wearing surfaces have become worn.

It is a further object of the invention to provide a new and improved means for securing the brake lining or friction surface to the shoes.

It is a still further object of the invention to so construct the cam-wearing surfaces of the shoes that they may be entirely renewed if desired.

With the above and other objects in view, reference is had to the accompanying drawings, in which—

Figure 1 is a view partly in elevation, of an internal brake constructed in accordance with the present invention;

Fig. 2 is a detail sectional view of the brake lining securing means;

Fig. 3 is a face view of one of the elements of the adjusting mechanism, and

Fig. 4 is a side view thereof.

Referring more particularly to the drawings, the reference character 5 designates the brake drum and carried by said brake drum in any suitable manner is a stub shaft or the like 6, which forms means for pivotally mounting and supporting the brake shoes 7. In order to provide for the proper support of the brake shoes 7, they are each provided with a curved seat 8, which curved seat 8 is adapted for engagement with the stub shaft 6. These brake shoes 7 are connected by means of coil springs 9 secured in eyelets or similar openings 10 carried by the brake shoes 7, and said brake shoes 7 are normally pulled one toward the other by said coil springs 9. In the present form of the invention, the opposite end of each of the brake shoes 7 is provided with a square shoulder 12, and each of said square shoulders 12 is provided with internally threaded sockets 13 for the reception of bolts or screws 14. These bolts or screws 14 are adapted to form the means by which the wearing blocks 15 are secured to the shoes 7.

Interposed between the wearing blocks 15 and the square shoulders 12 of the brake shoes 7, are wedge-shaped blocks 16, and said wedge-shaped blocks 16 are each provided with an elongated slot 17 more clearly shown in Figs. 3 and 4 to permit sliding movement thereof. One face of each of the wedge-shaped blocks 16 is serrated as at 19, and one edge of each of the square portions 12 of the brake shoes 7, is also serrated for interengagement with the serrations of the wedge blocks 16 in order that the latter may be secured to said square portions 12 in such a manner as to be immovable with respect thereto.

In assembling the device, the wedge blocks are first positioned on the square ends 12 of the brake shoes 7, after which the wearing blocks 15 are positioned on the wedge blocks 16. The screws or bolts 14 are now positioned and tightened up, the said screws or bolts serving to retain both the wedge blocks 16 and the wearing blocks 15 in position. The reference character 18 designates the cam which is rotated in any suitable manner to expand the brake shoes into contact with the interior surface of the brake drum 5 in order that a braking action may be had. Should the wearing blocks 15 become worn to the extent that upon a rocking of the cam 18, sufficient movement of the brake shoes would not be had to form an effective braking operation, it is only necessary to loosen the screws or bolts 14 and slide the wedge blocks to a position where the space between the wearing blocks will be reduced, thus permitting the cam 18 to act sufficiently to expand the shoes 7 the required distance to provide the necessary braking action.

Each of the brake shoes 7 is provided with a friction surface 20, and said friction surfaces 20 are secured to their respective brake shoes 7 in the following manner: Each of the brake shoes is provided adjacent each of its ends with a curved seat 21, and projecting from said curved seat 21 is a hollow extension 22. The hollow extensions 22 are each adapted to receive a bolt 23, upon the inner end of which is a nut 24, the outer end of the bolt 23 being provided with a head 25. Carried by the outer end of each of the bolts 23 is a washer 26, and each of said washers 26 has a curved serrated surface 27, the arc of the surface 27 corresponding to the arc of the curved seat 21. The friction surface 20 is preferably formed of leather, asbestos, or other suitable material commonly used for the purpose, and in attaching said friction surface, it is placed around the brake shoes with its ends positioned on their respective curved seats 21. After this has been accomplished, the nut 24 is tightened and the serrated curved face 27 of the washer 26 engages the ends of the friction surface 20. Upon further tightening of the nut 24, the ends of the friction surface are pressed against the curved seat 21 and the washer 26, said friction surface conforming to the arc of the serrated edge 27 and the arc of the curved seat 21. When the device has been completely set, it is apparent that the head 25 of the bolt 23, and the washer 26, will both occupy a position below the outer surface of the friction surface and will not contact with the inner face of the brake drum upon movement of the brake shoes into engagement with said inner face.

From the above, it is apparent that the present invention provides a new and novel means for securing the friction surface of an internal brake in position. In addition to the foregoing, it is obvious that owing to the curved serrated faces of the several washers, the friction surfaces upon which they operate will be stretched tightly over the shoes and will be placed under tension thereon. By this construction the rivets commonly employed for securing the friction surfaces to the shoes are eliminated, thus removing the wear and tear upon the inner surface of the brake drum as well as objectionable noises due to engagement of the rivets with the inner surface of the brake drum upon application of the brakes.

It is apparent from the foregoing that in addition to a new and novel means for securing the friction surface of an internal brake to the brake shoes, the present invention provides a new and novel form of attachment, by means of which the wear of the friction surfaces may be adjusted either in unison or independently since the throw of each brake shoe depends upon the position of its particular wearing block and wedge block, and by such a construction it is apparent that the swinging movement of either brake shoe may be varied if desired.

I claim:

In an internal brake, a drum, a pair of brake shoes mounted within the drum and adapted to be expanded into engagement therewith, said brake shoes having two of their adjacent ends arranged in spaced relation, a cam interposed between said spaced ends, a wear block removably secured to each of said spaced ends, a slotted wedge block interposed between each of said wear blocks and its respective brake shoe, a plurality of serrations formed on each of said slotted wedge blocks and adapted for interengagement with serrations formed on its respective shoe, and securing means for the wear blocks, the securing means of each wear block passing through the slot of its respective slotted wedge block to secure the wear block and wedge block in position on its respective brake shoe.

VICTOR W. PAGÉ.